(12) United States Patent
Higuchi

(10) Patent No.: US 10,583,752 B2
(45) Date of Patent: Mar. 10, 2020

(54) SEAT SLIDING DEVICE

(71) Applicant: TOYOTA BOSHOKU KABUSHIKI KAISHA, Aichi (JP)

(72) Inventor: Tadasuke Higuchi, Aichi (JP)

(73) Assignee: TOYOTA BOSHOKU KABUSHIKI KAISHA, Aichi (JP)

(*) Notice: Subject to any disclaimer, the term of this patent is extended or adjusted under 35 U.S.C. 154(b) by 0 days.

(21) Appl. No.: 16/205,773

(22) Filed: Nov. 30, 2018

(65) Prior Publication Data

US 2019/0168636 A1  Jun. 6, 2019

(30) Foreign Application Priority Data

Dec. 1, 2017  (JP) .................................. 2017-231666
May 25, 2018  (JP) .................................. 2018-100281

(51) Int. Cl.
*B60N 2/07* (2006.01)
*B60N 2/02* (2006.01)
*B60N 2/075* (2006.01)

(52) U.S. Cl.
CPC ........... *B60N 2/0232* (2013.01); *B60N 2/075* (2013.01); *B60N 2/0727* (2013.01); *B60N 2002/0236* (2013.01)

(58) Field of Classification Search
CPC .... B60N 2/0727; B60N 2/0232; B60N 2/075; B60N 2002/0236; B60N 2/067; B60N 2/0843; B60N 2/0825; B60N 2/06; F16H 1/20; F16H 19/04
USPC ................................ 248/424, 425, 428, 429
See application file for complete search history.

(56) References Cited

U.S. PATENT DOCUMENTS

| | | | |
|---|---|---|---|
| 2,930,428 A * | 3/1960 | De Rose | B60N 2/0232 248/394 |
| 9,789,965 B2 * | 10/2017 | Benthien | B60N 2/072 |
| 9,827,879 B2 | 11/2017 | Fujita et al. | |
| 9,994,130 B2 * | 6/2018 | Michels | B60N 2/14 |
| 10,220,732 B2 * | 3/2019 | Auer | B60N 2/0727 |
| 2011/0062285 A1 * | 3/2011 | Herzog | B64D 11/00 244/118.6 |
| 2015/0045168 A1 * | 2/2015 | Kienke | B60N 2/0224 475/149 |
| 2015/0069807 A1 * | 3/2015 | Kienke | B60N 2/0232 297/344.1 |
| 2015/0289665 A1 * | 10/2015 | Klimm | F16H 19/04 74/89.14 |
| 2016/0114703 A1 * | 4/2016 | Fujita | B60N 2/0232 297/344.1 |

(Continued)

FOREIGN PATENT DOCUMENTS

JP   2015-116833   6/2015

*Primary Examiner* — Nkeisha Smith
(74) *Attorney, Agent, or Firm* — Greenblum & Bernstein, P.L.C.

(57) ABSTRACT

A sliding device of the present disclosure includes: a fixed rail; a movable rail; a rack; a pinion; an intermediate gear; a driving device; and a support member. The support member includes a first support body and a second support body. The first support body and the second support body being coupled below the pinion and integrally molded. The sliding device further includes a restricting body configured to restrict elastic displacement such that an end of the first support body above the pinion and an end of the second support body above the pinion separate from each other.

5 Claims, 15 Drawing Sheets

(56) References Cited

U.S. PATENT DOCUMENTS

2017/0184151 A1* 6/2017 Huang .................. F16C 29/008
2017/0368962 A1* 12/2017 Auer .................... B60N 2/0727
2018/0334054 A1* 11/2018 Higuchi ............... B60N 2/0232
2019/0093738 A1* 3/2019 Almqvist ............. B25H 1/0064

* cited by examiner

SEAT SLIDING DEVICE

CROSS-REFERENCE TO RELATED APPLICATIONS

This application claims the benefit of Japanese Patent Application No. 2017-231666 filed on Dec. 1, 2017 and No. 2018-100281 filed on May 25, 2018 with the Japan Patent Office, the entire disclosures of which are incorporated herein by reference.

BACKGROUND

The present disclosure relates to a sliding device that slidably supports a seat for vehicle.

For example, a sliding device disclosed in Japanese Unexamined Patent Application Publication No. 2015-116833 (Patent Document 1) includes a rack fixed to an outer surface of a fixed rail, a pinion configured to be displaced integrally with a movable rail, and an electric motor configured to supply a driving force to the pinion, and the like. An output shaft of the electric motor is fitted to a rotation center axis of the pinion. That is, the electric motor directly supplies the driving force to the pinion without passing through an intermediate gear or the like.

SUMMARY

In the sliding device including the rack fixed inside the fixed rail (hereinafter, built-in sliding device), a part of the pinion is located inside the fixed rail. Therefore, in the built-in sliding device, if the output shaft of the electric motor is configured to be fitted to the rotation center axis of the pinion, it is highly probable that the electric motor interferes with the fixed rail.

The present disclosure discloses an example of a built-in sliding device that can avoid interference between a driving device, such as an electric motor, and a fixed rail.

It is desirable that the sliding device comprises the following components: a fixed rail fixed to a vehicle; a movable rail to which a seat for vehicle is fixed and which is slidable with respect to the fixed rail; a rack fixed inside the fixed rail and extending in parallel to a longitudinal direction of the fixed rail; a pinion arranged above the rack and configured to mesh with the rack; an intermediate gear configured to mesh with the pinion and receive a driving force to rotate so as to transmit the driving force to the pinion; a driving device configured to supply the driving force to the intermediate gear; and a support member configured to support the pinion and the intermediate gear and fixed to the movable rail.

As a result, the driving device of the sliding device is arranged at a position separated from the pinion, as compared to the electric motor of the sliding device disclosed in Patent Document 1. Therefore, in the present sliding device, interference between the driving device and the fixed rail can be avoided.

If a relative position of the intermediate gear to the pinion is largely deviated, the sliding device, when activated, produces large operating sound and vibration. On the other hand, in the present sliding device, a first support body and a second support body for supporting the pinion and the intermediate gear are integrally molded (hereinafter, integral configuration).

As a result, as compared to a configuration in which the first support body and the second support body are assembled together (hereinafter, assembled configuration), a relative positional deviation (hereinafter, variation in dimension) of the intermediate gear to the pinion is reduced. Therefore, improper meshing between the pinion and the intermediate gear is inhibited.

That is, variation in dimension of the assembled configuration is an accumulated value of a dimensional variation of each of the first support body and the second support body, an assembling variation caused during assembling work, and the like. In contrast, variation in dimension of the integral configuration is only a dimensional variation of one component integrally configured. Accordingly, the integral configuration has a smaller variation in dimension than the assembled configuration.

A person or an assembling device (hereinafter, operator or the like) that assembles the pinion to the support member elastically deforms the first support body and the second support body so as to separate an upper end of the first support body and an upper end of the second support body from each other, and then assembles the pinion to the first support body and the second support body.

The operator or the like, after the assembling work is completed, assembles a restricting body to the upper end of the first support body and the upper end of the second support body.

As a result, separation of the upper end of the first support body and the upper end of the second support body is restricted by the restricting body. Therefore, separation of the pinion from the first support body and the second support body, after the assembling work is completed, is inhibited.

The sliding device may be configured as follows.

It is desirable that the restricting body is configured to include a first spacer arranged between a first wall and the first support body, and a second spacer arranged between a second wall and the second support body.

As a result, elastic displacement of the upper end of the first support body and the upper end of the second support body is restricted by the movable rail. Therefore, increase in number of components, assembling steps and the like, of the restricting body is inhibited.

The first wall is provided in the movable rail, and is separated from the first support body on an opposite side of the second support body with the first support body interposed therebetween. The second wall is provided in the movable rail, and is separated from the second support body on an opposite side of the first support body with the second support body interposed therebetween.

A bolt for fixing the driving device to the movable rail extends parallel to a center axis. Further, it is desirable that the bolt penetrates the first spacer, the second spacer, the first support body, the second support body, the first wall and the second wall, and the first spacer and the second spacer are made from rubber.

As a result, the first spacer and the second spacer, together with the driving device, are fixed to the movable rail by the bolt. Therefore, a fixing structure of the restricting body can be simple. Further, vibration generated when the driving device operates is absorbed by the rubber-made first spacer and second spacer.

In addition, it is desirable that the first support body and the second support body are integrally molded with resin. As a result, productivity of the support member is improved, and increase in manufacturing cost of the support member is inhibited.

It is desirable that the rack has an involute tooth profile or a trapezoid tooth profile. As a result, it becomes possible to make the rack and the pinion mesh with each other smoothly. Therefore, durability of the rack and the pinion can be improved.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

An "embodiment" described below shows an example embodiment within the technical scope of the present disclosure. Matters that specify the inventions recited in the claims are not limited to specific configurations, structures, etc. defined in the embodiments below.

The present embodiment describes an example of a seat mounted on a vehicle (hereinafter, vehicle seat). Arrows and the like indicating directions attached to respective figures are provided to make it easy to understand the relationship between the respective figures.

The present disclosure is not limited to the directions shown in the respective figures. Each direction indicates a direction in a state in which the vehicle seat is assembled to the vehicle.

[First Embodiment]

1. Outline of Vehicle Seat

Figure 1:
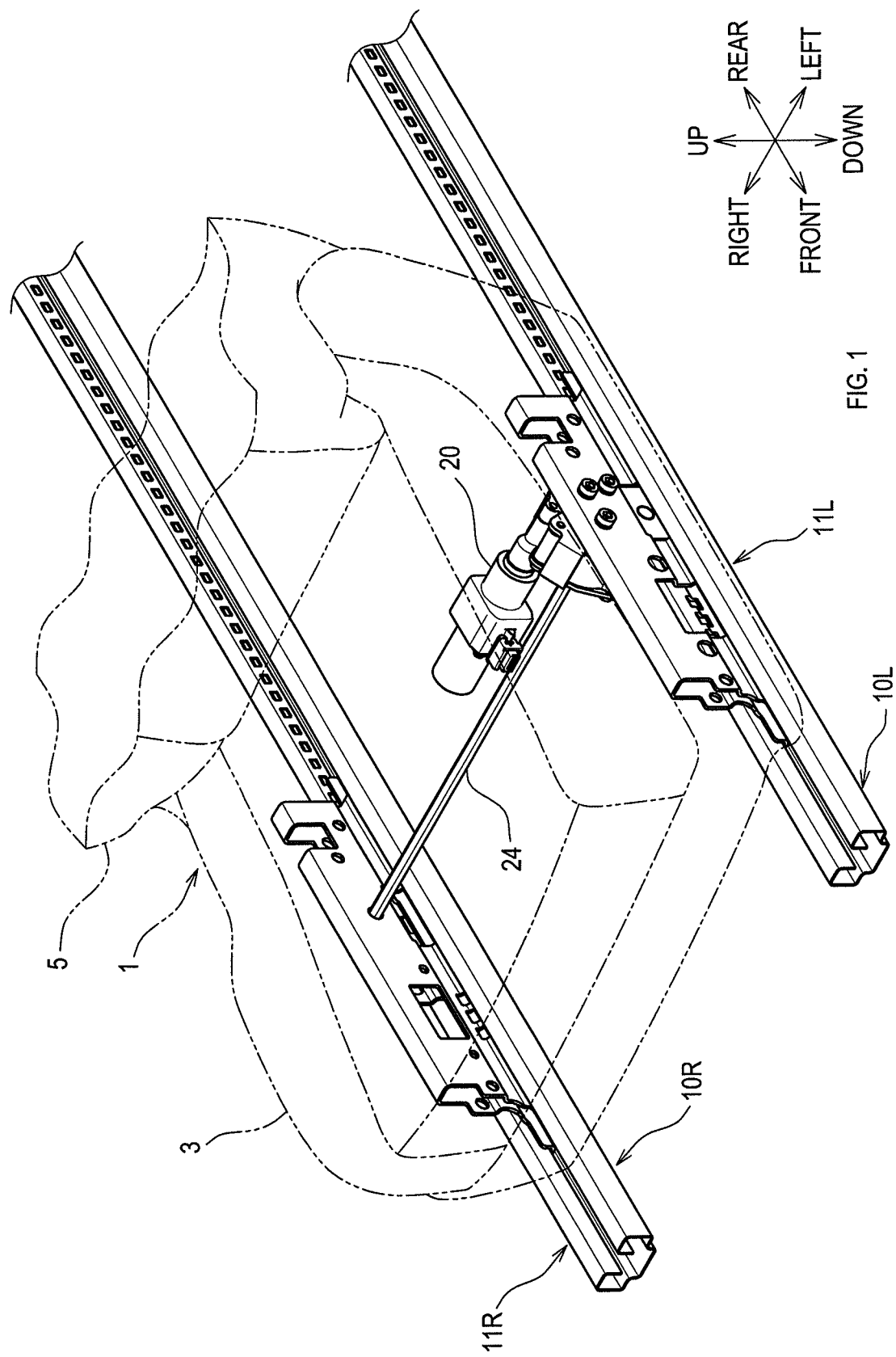
FIG. 1 is a view showing a vehicle seat and a sliding device according to a first embodiment.

A vehicle seat 1, as shown in FIG. 1, includes a seat cushion 3 and a seatback 5. The seat cushion 3 supports the buttocks of an occupant. The seatback 5 supports the back of the occupant.

The vehicle seat 1 is fixed to a vehicle via a sliding device 10R and a sliding device 10L respectively arranged on a right end and a left end of the vehicle seat 1. The two sliding devices 10R, 10L are devices for slidably supporting the vehicle seat 1.

2. Configuration of Sliding Device 2.1 Outline of Sliding Device

The sliding device 10R includes a support unit 11R. The sliding device 10L includes a support unit 11L and a driving device 20.

The support unit 11R arranged on the right end and the support unit 11L arranged on the left end have the same structure. Hereinafter, the sliding device 10L arranged on the right end will be described in detail.

2.2 Detail of Sliding Device

<Support Unit>

Figure 2:
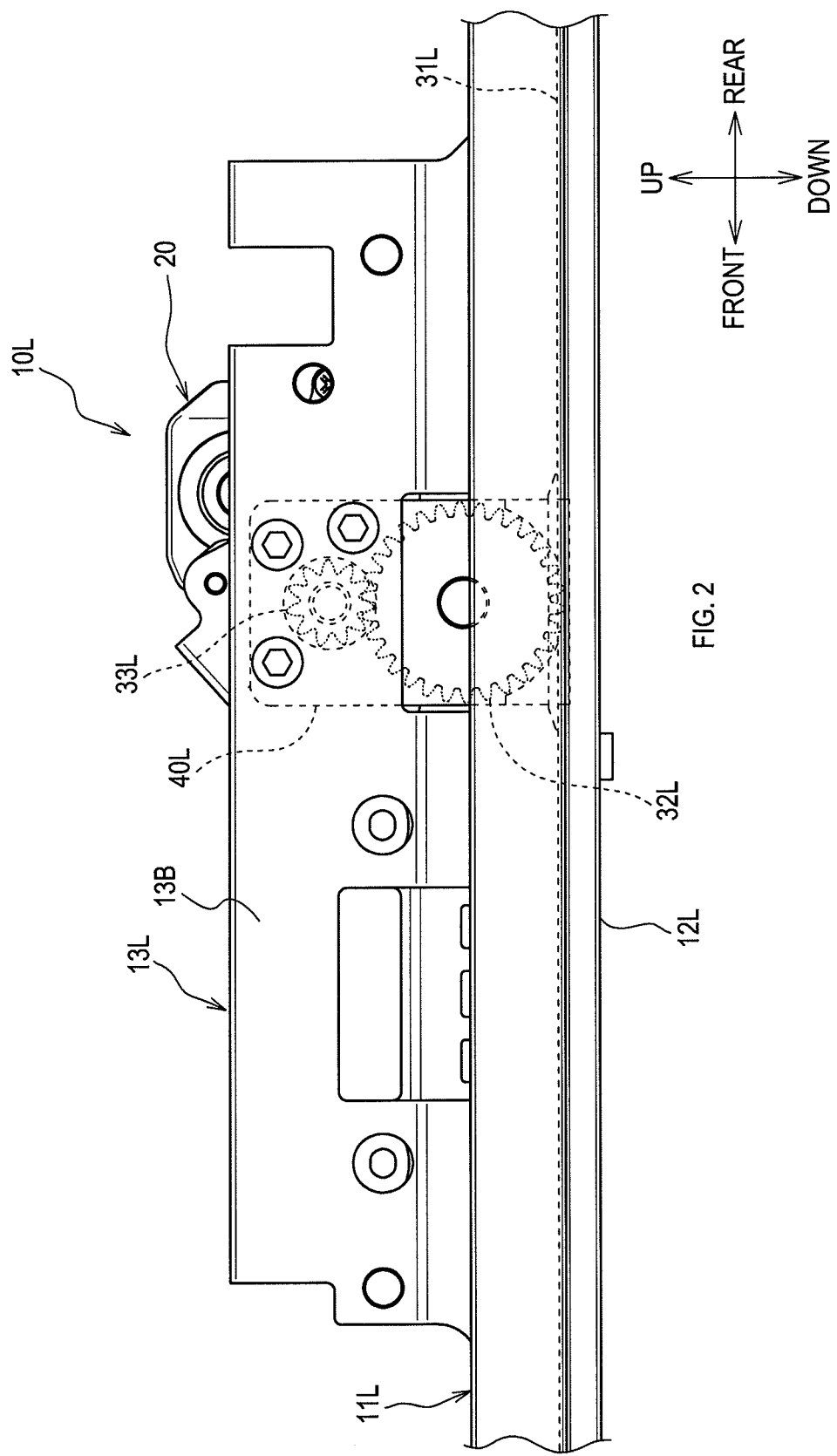
FIG. 2 is a side view of the sliding device according to the first embodiment.

The support unit 11L, as shown in FIG. 2, at least includes a fixed rail 12L and a movable rail 13L. The fixed rail 12L is directly or indirectly fixed to the vehicle.

The vehicle seat 1 is fixed to the movable rail 13L. The movable rail 13L is slidable with respect to the fixed rail 12L. In other words, the vehicle seat 1 is slidably mounted on the vehicle via the support unit 11L (and the support unit 11R).

<Slide Drive Mechanism>

Figure 3:
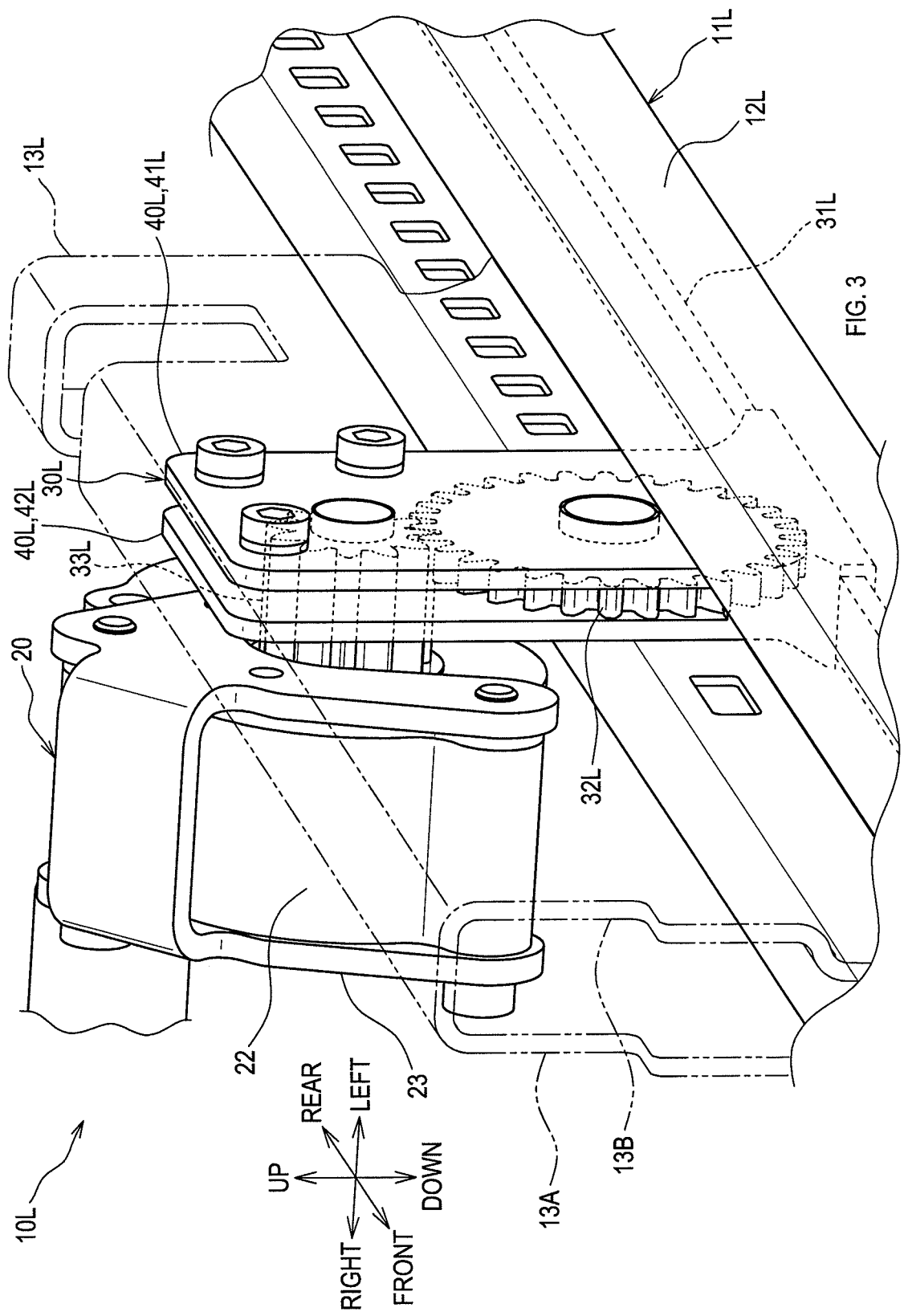
FIG. 3 is a view showing the sliding device according to the first embodiment.

A slide drive mechanism 30L displaces the movable rail 13L by sliding. As shown in FIG. 3, the slide drive mechanism 30L includes the driving device 20, a rack 31L, and a pinion 32L.

Figure 4:
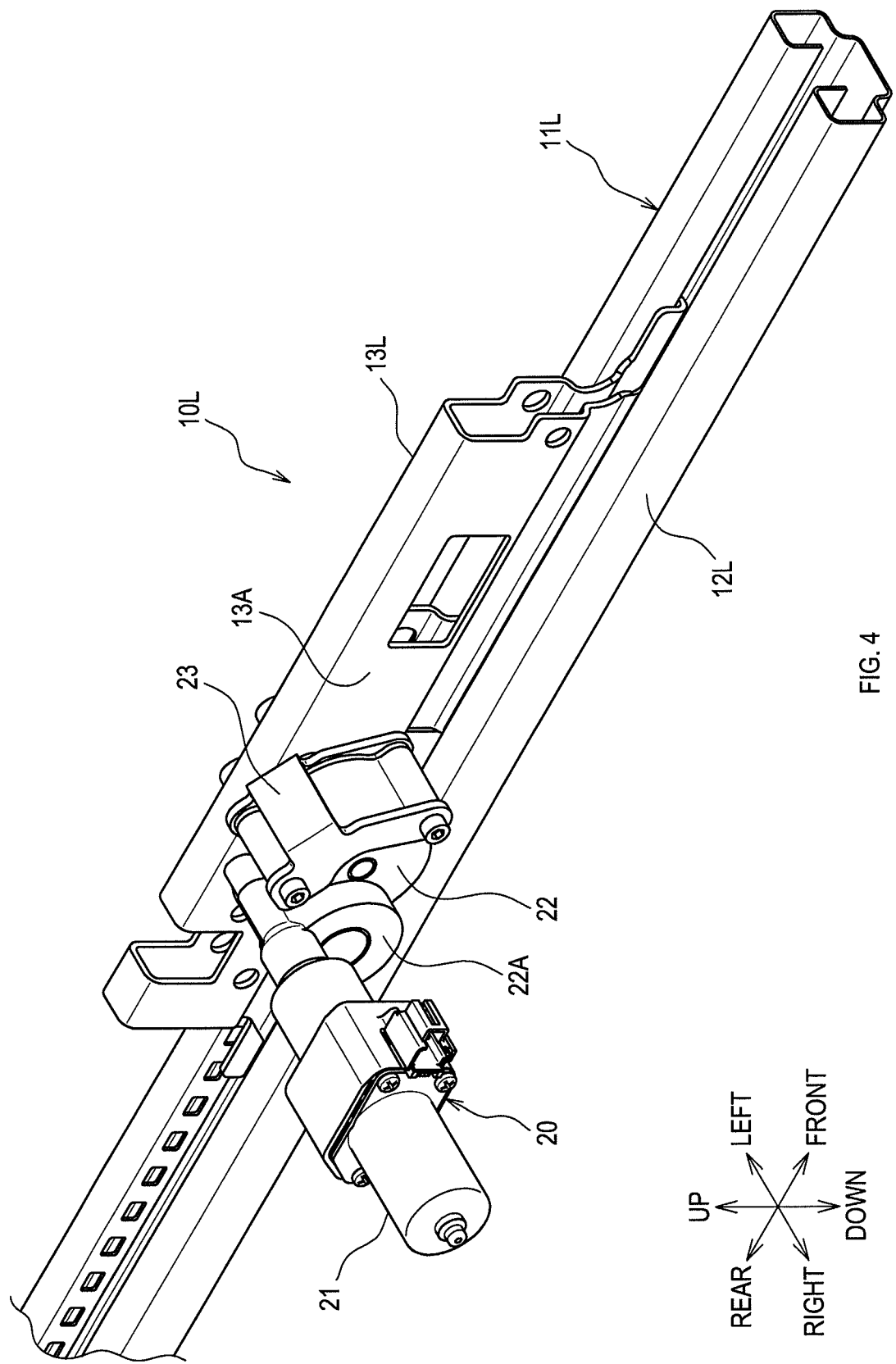
FIG. 4 is a view showing the sliding device according to the first embodiment.

The driving device 20 generates a driving force for rotating the pinion 32L. The driving device 20, as shown in FIG. 4, includes an electric motor 21, a deceleration mechanism 22, and a bracket 23. The deceleration mechanism 22 is a gear mechanism which decelerates and outputs a rotational force generated in the electric motor 21.

The electric motor 21 and the deceleration mechanism 22 are integrated by a gear casing 22A which accommodates the deceleration mechanism 22. The bracket 23 fixes the driving device 20 to the movable rail 13L.

Figure 5:
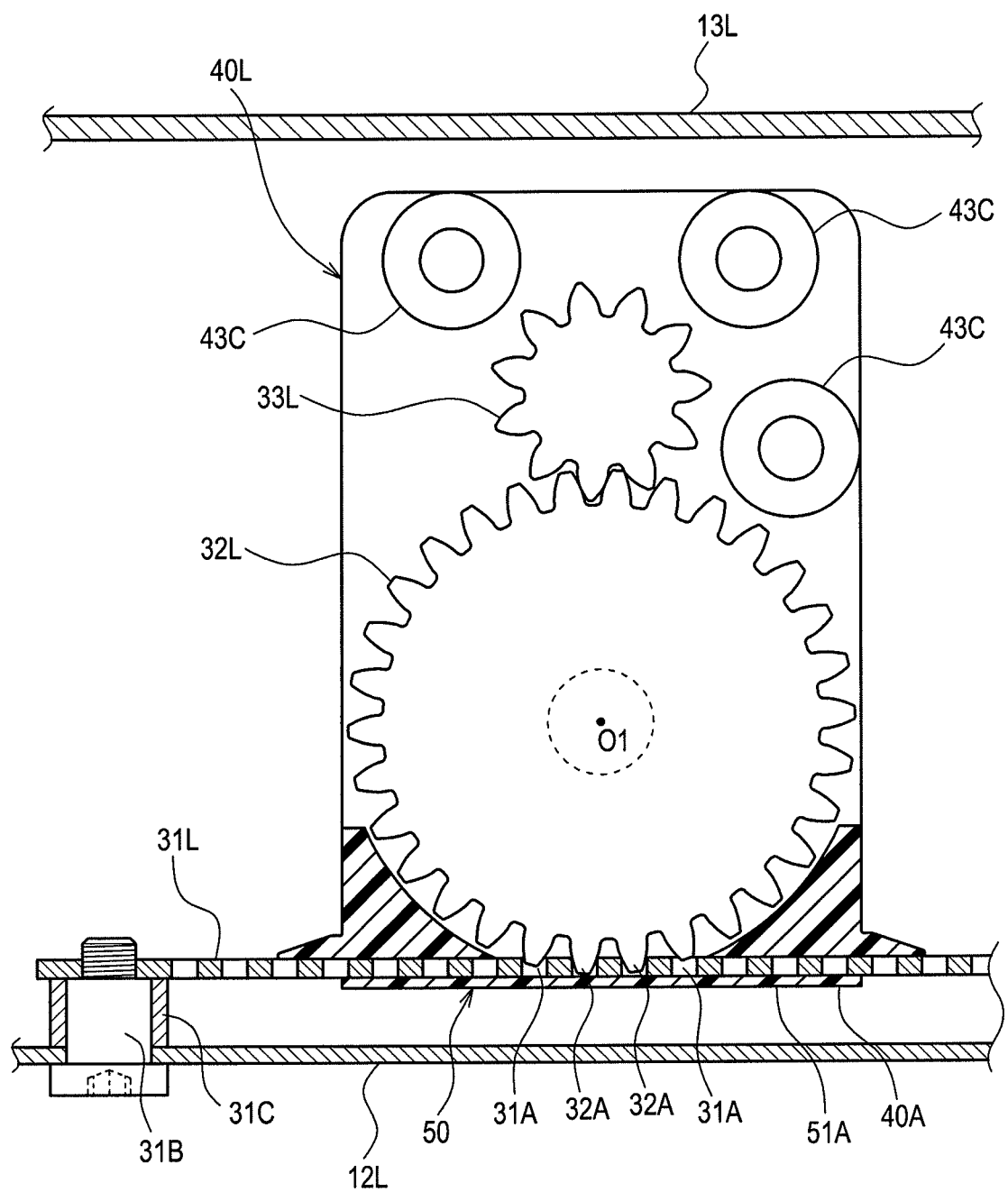
FIG. 5 is a view showing meshing of an intermediate gear, a pinion and a rack in the sliding device according to the first embodiment.
Figure 5:
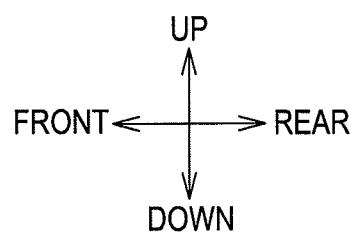

The rack 31L, as shown in FIG. 2, is a gear having an infinite radius which, in a state fixed inside the fixed rail 12L, extends in parallel with a longitudinal direction of the fixed rail 12L. The pinion 32L, as shown in FIG. 5, is a gear that is arranged above the rack 31L and meshes with the rack 31L.

Figure 6:
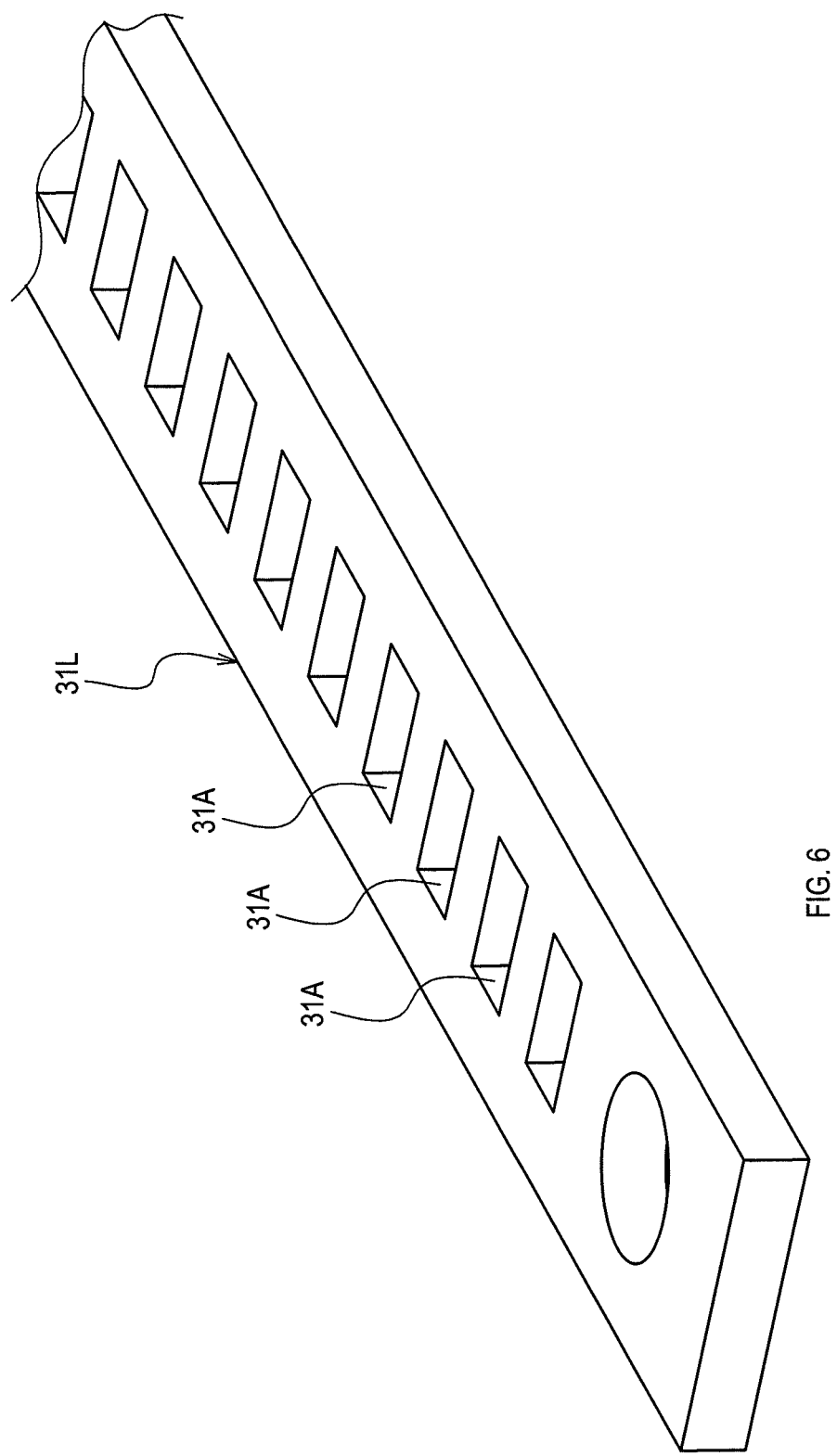
FIG. 6 is a view showing the rack according to the first embodiment.

In other words, the pinion 32L is a gear having an infinite radius which has a plurality of toothed portions 32A that mesh with the rack 31L and which has a rotation center O1 above the rack 31L. The rack 31L, as shown in FIG. 6, is a strip-like member having a plurality of holes 31A into which the respective toothed portions 32A can be inserted.

The rack 31L is a metal strip, such as a rolled steel sheet, having the plurality of holes 31A formed by press molding or the like. Both ends in the longitudinal direction of the rack 31L, as shown in FIG. 5, are fixed to the fixed rail 12L by fixtures 31B such as bolts or pins. A collar 31C is a cylindrical member for restricting a vertical position of the rack 31L.

An intermediate gear 33L, in a state meshing with the pinion 32L, receives a driving force from the driving device 20 and rotates. In other words, the intermediate gear 33L, by receiving the driving force from the driving device 20 and rotating, transmits the driving force to the pinion 32L. The intermediate gear 33L also serves as an output gear of the driving device 20 (see FIG. 7).

The driving force transmitted by the intermediate gear 33L is also transmitted to the sliding device 10R arranged on the right end via a driving shaft 24 (see FIG. 1). Therefore, the sliding devices 10R, 10L operate in a mechanically synchronized manner.

<Support Member>

Figure 8:
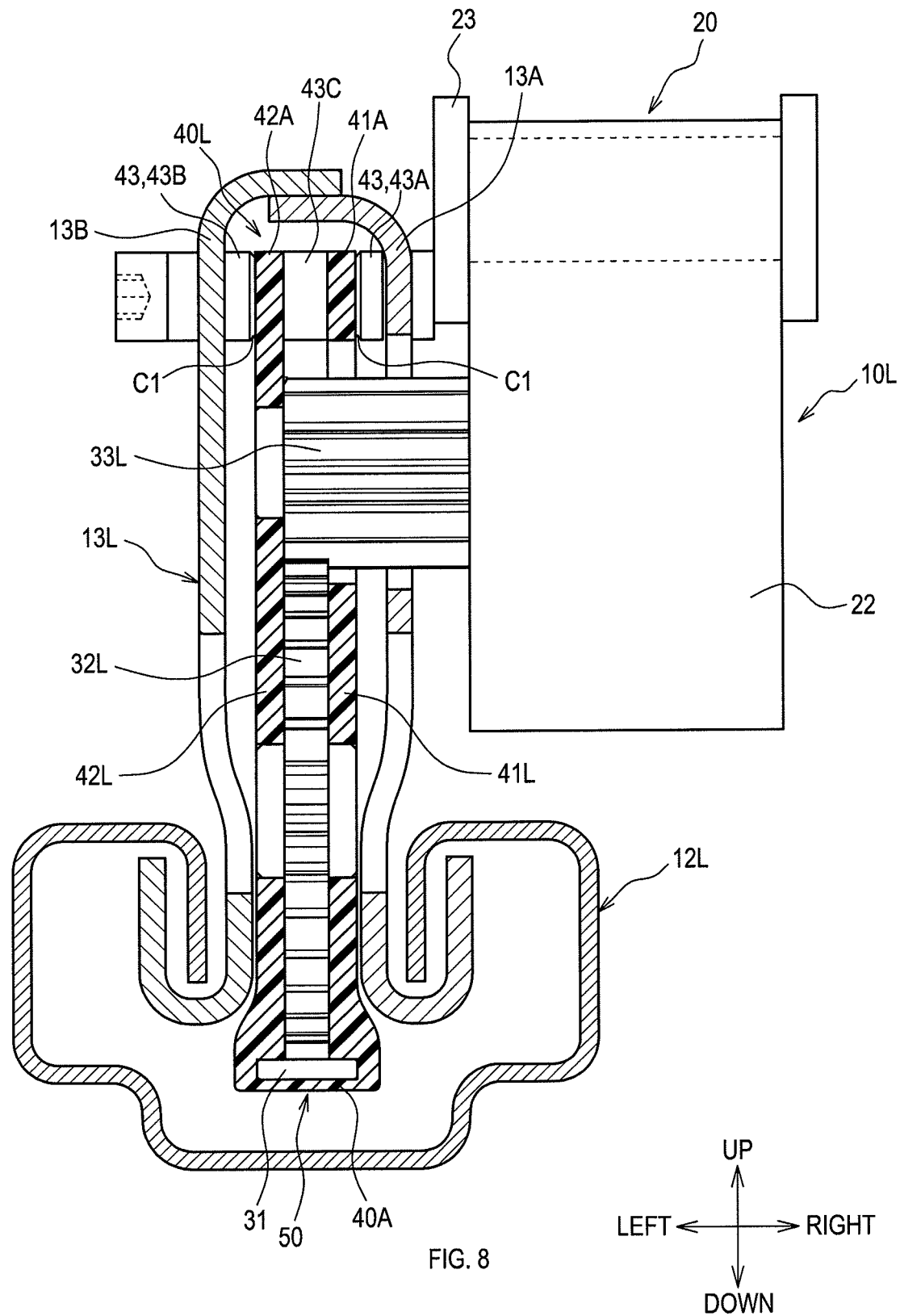
FIG. 8 is a view showing a structure of a support member according to the first embodiment.
Figure 9:
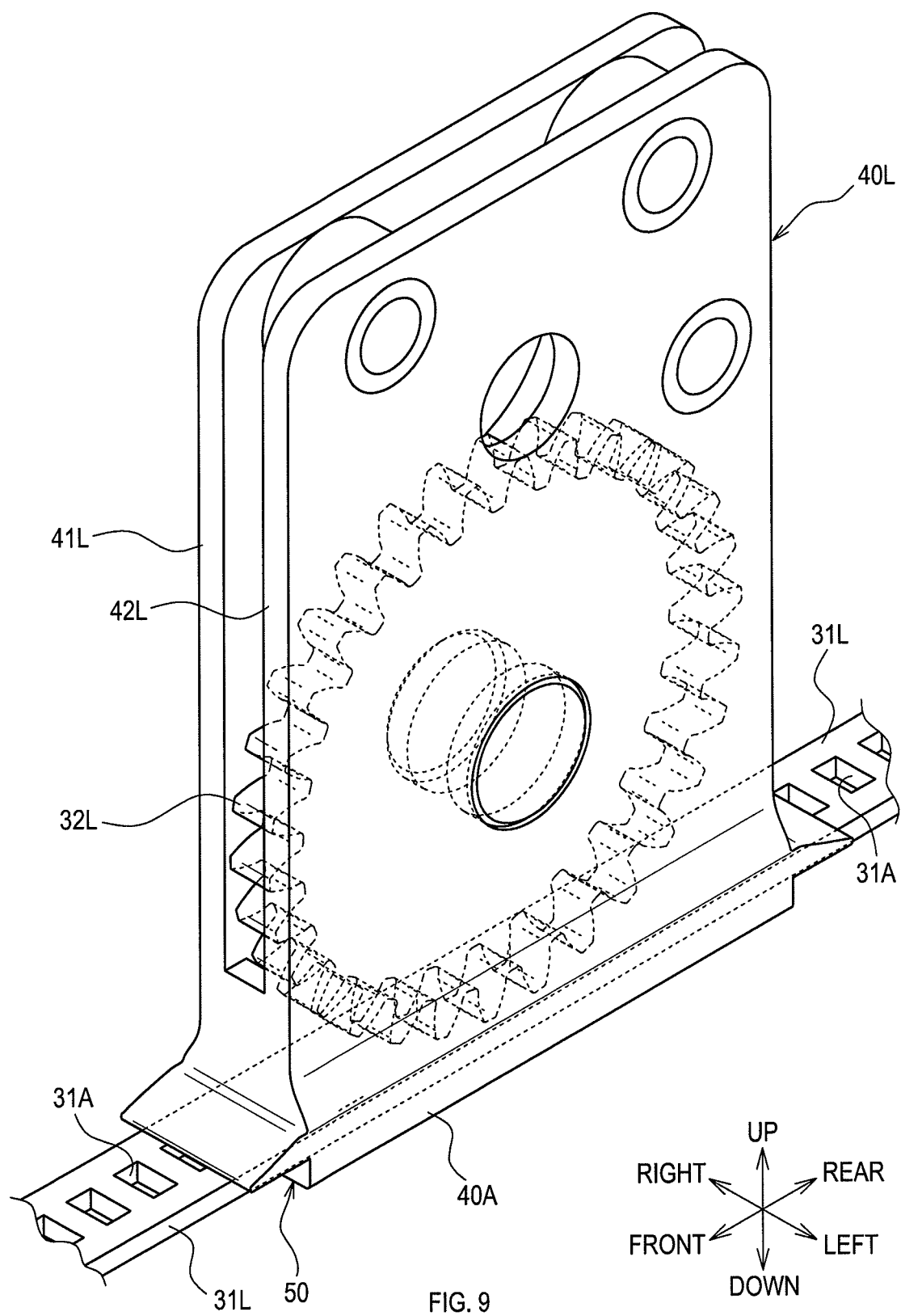
FIG. 9 is a perspective view showing the structure of the support member according to the first embodiment.

A support member 40L, as shown in FIGS. 8 and 9, rotatably supports the pinion 32L and the intermediate gear 33L. The support member 40L includes a first support body 41L and a second support body 42L.

The first support body 41L and the second support body 42L (support member 40L) are integrally molded with resin or metal. In the first embodiment, the first support body 41L and the second support body 42L are integrally molded with resin. The first support body 41L is an elastically deformable planar portion which supports one end in a center axis direction of the pinion 32L (right end in FIG. 8). The one end in the center axis direction of the intermediate gear 33L is rotatably supported by the gear casing 22A.

The second support body 42L is an elastically deformable planar portion that supports the other end in the center axis direction of the pinion 32L and the intermediate gear 33L (left end in FIG. 8). In other words, in the center axis direction of the pinion 32L, the first support body 41L is located on an opposite side of the second support body 42L with the pinion 32L interposed therebetween.

Lower ends 40A of the first support body 41L and the second support body 42L (support member 40L) are located below the pinion 32L. The first support body 41L and the second support body 42L are coupled and integrated below the pinion 32L (lower end 40A side in the present first embodiment).

In other words, the support member 40L projected on a virtual surface orthogonal to an extending direction of the rack 31L, as shown in FIG. 9, is formed in a substantially U-shape coupled on the rack 31L side. The lower ends 40A of the support member 40L, as shown in FIG. 8, are located below the rack 31L.

Upper ends of the support member 40L, that is, an upper end 41A of the first support body 41L and an upper end 42A of the second support body 42L are located inside the movable rail 13L, that is between a first wall 13A and a second wall 13B. The first wall 13A configures a part of the movable rail 13L and is separated from the first support body 41L on an opposite side of the second support body 42L with the support body 41L interposed therebetween.

The second wall 13B configures a part of the movable rail 13L and is separated from the second support body 42L on an opposite side of the first support body 41L with the second support body 42L interposed therebetween. The first wall 13A and the second wall 13B are coupled at upper ends by welding or with a joining member such as a fastener.

A first spacer 43A is arranged between the first wall 13A and the first support body 41L. A second spacer 43B is arranged between the second wall 13B and the second support body 42L. The first spacer 43A and the second spacer 43B are examples of the restricting body 43.

The restricting body 43 restricts elastic displacement such that the upper end 41A of the first support body 41L and the upper end 42A of the second support body 42L separate from each other. In other words, the first wall 13A and the second wall 13B are metal members coupled to each other at their upper ends so as to form a substantially U-shape.

Because the first spacer 43A is arranged between the first wall 13A and the first support body 41L, the first support body 41L is restricted from being largely displaced toward the first wall 13A side in a manner to separate from the second support body 42L.

Similarly, because the second spacer 43B is arranged between the second wall 13B and the second support body 42L, the second support body 42L is restricted from being largely displaced toward the second wall 13B side in a manner to separate from the first support body 41L.

<Fixing Structure of Support Member>

Figure 10:
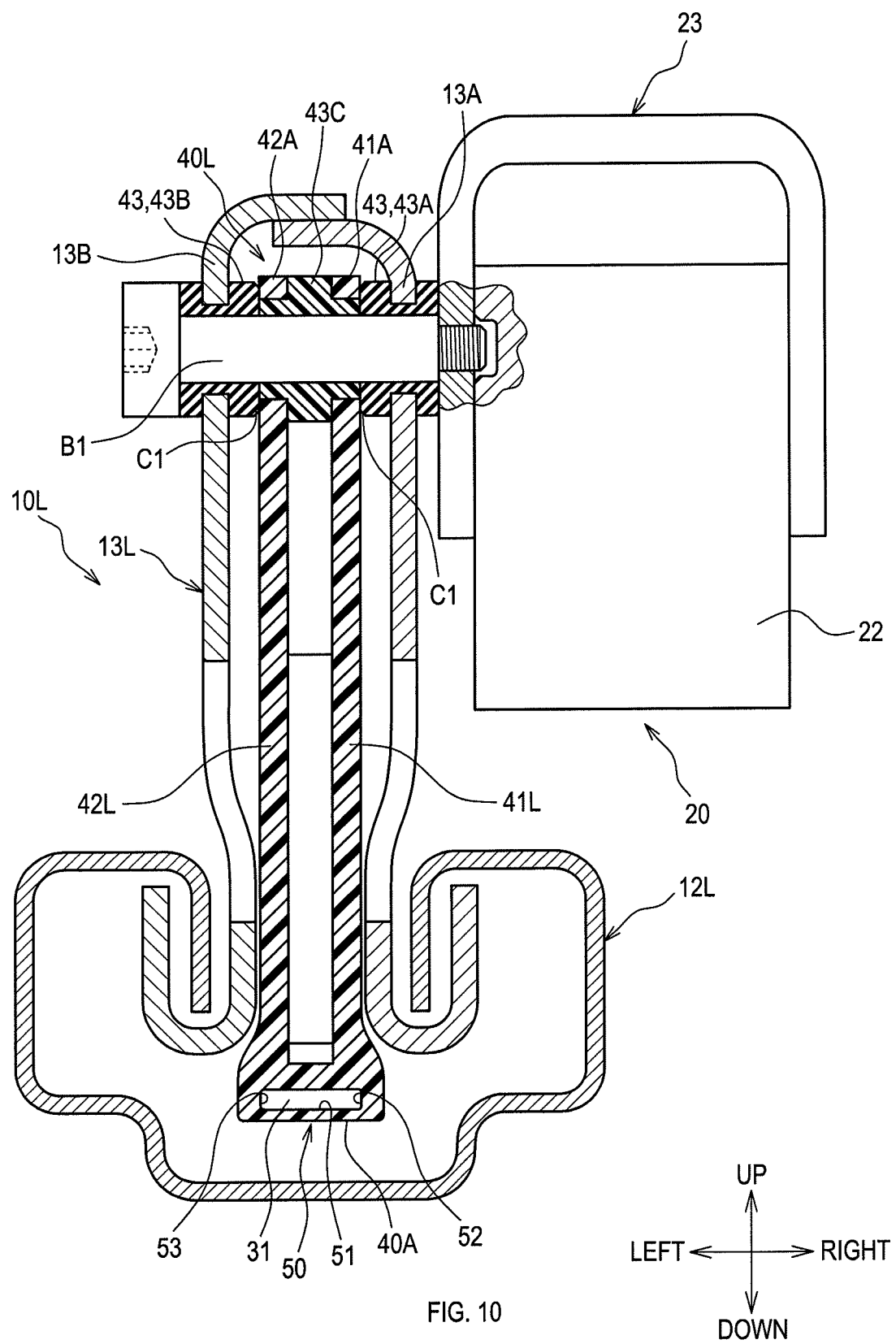
FIG. 10 is a view showing the structure of the support member according to the first embodiment.

The support member 40L, in a state arranged inside the movable rail 13L, is fixed to the movable rail 13L. Specifically, as shown in FIG. 10, the support member 40L is fixed to the movable rail 13L by a bolt (bolt with a lock hole, in the first embodiment) B1 extending in parallel to the center axis of the pinion 32L.

The bolt B1 penetrates the first spacer 43A, the second spacer 43B, the first support body 41L, the second support body 42L, the first wall 13A and the second wall 13B, and is coupled to the bracket 23 of the driving device 20.

In other words, the bolt B1 fixes the support member 40L to the movable rail 13L, and also fixes the driving device 20 to the movable rail 13L. A third spacer 43C made of resin is arranged between the first support body 41L and the second support body 42L. The bolt B1 also penetrates the third spacer 43C.

Figure 11:
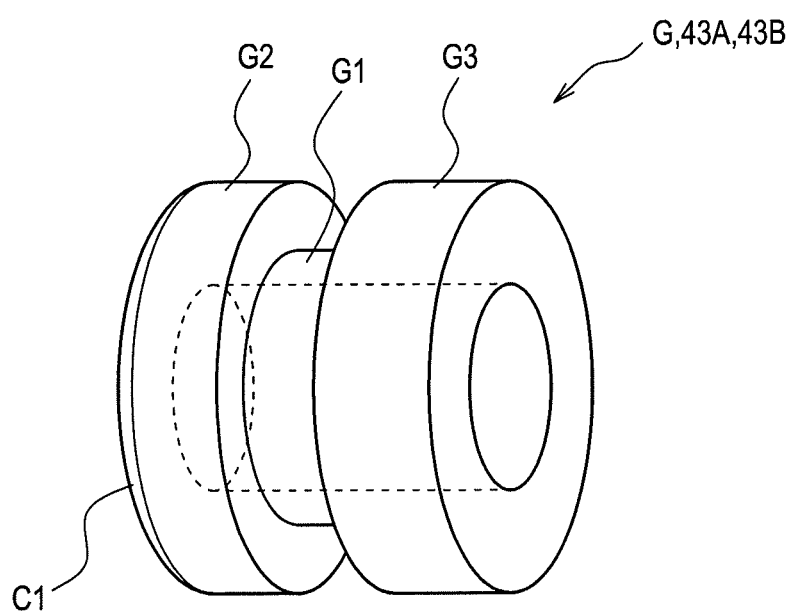
FIG. 11 is a view showing a grommet according to the first embodiment.

The first spacer 43A and the second spacer 43B according to the first embodiment are configured by a grommet G shown in FIG. 11. The grommet G is configured by a cylindrical tube portion G1 having disc shaped flanges G2, G3 on its opposite ends.

The tube portion G1 and the flanges G2, G3 are integrally molded with resin such as rubber. In the first embodiment, the flange G2 of the grommet G is utilized as the first spacer 43A and the second spacer 43B.

The flange G2 is provided with a tapered chamfered portion C1. The chamfered portion C1, as shown in FIG. 10, is provided on an end surface side of the flange G2 which is in contact with the first support body 41L or the second support body 42L.

Figure 7:
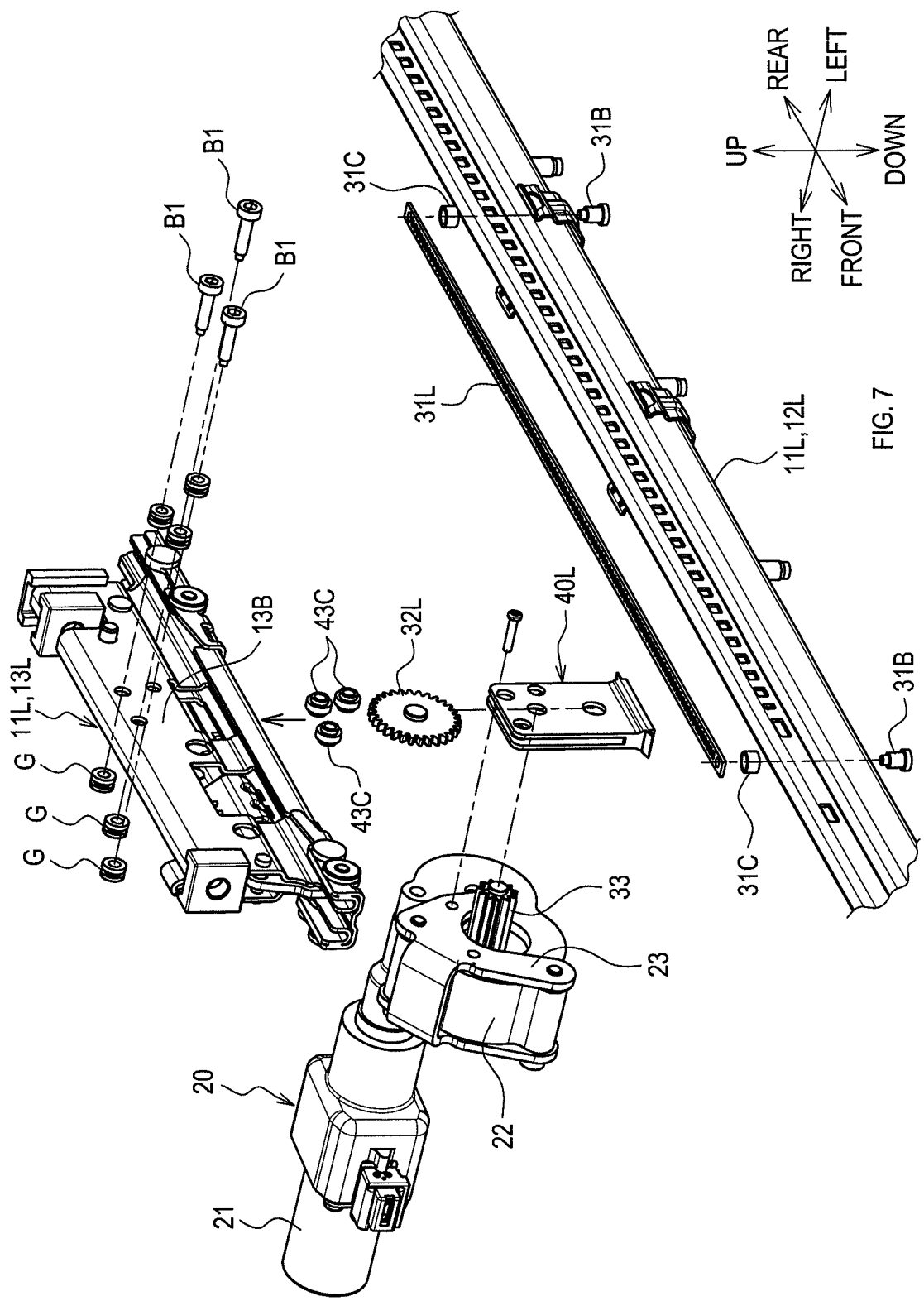
FIG. 7 is an exploded perspective view of the sliding device according to the first embodiment.

In the first embodiment, as shown in FIG. 7, the support member 40L and the driving device 20 are fixed to the movable rail 13L with three bolts B1. Therefore, three grommets G (three first spacers 43A and three second spacers 43B) and three third spacers 43C are provided.

<Restricting Structure of Rack Position>

As shown in FIG. 5, a restrictor 50 is provided on the lower end 40A side of the support member 40L. The restrictor 50 comes into contact with the rack 31L when at least the movable rail 13L slides, that is, when the pinion 32L rotates, and restricts the rack 31L from being displaced in a direction to separate from the pinion 32L.

The restrictor 50, as shown in FIG. 10, includes a first sliding contact portion 51, a second sliding contact portion 52, a third sliding contact portion 53, and the like. The first sliding contact portion 51 can slidably contact at least a part of the lower surface of the rack 31L (see FIG. 5).

Assuming that a horizontal direction substantially orthogonal to the longitudinal direction of the rack 31L is a width direction, the first sliding contact portion 51, as shown in FIG. 10, can slidably contact the lower surface of the rack 31L in the entire width direction.

The second sliding contact portion 52 can slidably contact one end in the width direction of the rack 31L (right side end in the first embodiment). The third sliding contact portion 53 can slidably contact the other end in the width direction of the rack 31L (left end in the first embodiment).

The portion among the first sliding contact portion 51, the second sliding contact portion 52 and the third sliding contact portion 53 which slidably contacts the rack 31L is provided over the entire longitudinal direction of the support member 40L. The longitudinal direction of the support member 40L is parallel to the longitudinal direction of the rack 31L.

The first sliding contact portion 51, the second sliding contact portion 52 and the third sliding contact portion 53 are configured by a through hole that penetrates in the longitudinal direction on the lower end 40A side of the support member 40L (see FIG. 10). The through hole has a substantially congruent shape with a sectional shape of the rack 31L.

3. Characteristics of Sliding Device According to First Embodiment 3.1 Support Member and the Like In the sliding device 10L, the driving force of the driving device 20 is transmitted to the pinion 32L via the intermediate gear 33L. Therefore, for example, as compared to a case in which the output shaft of the electric motor 21 is fitted to the rotation center axis of the pinion 32L, the driving device 20 is arranged at a position separated from the pinion 32L. Also, in the sliding device 10L, interference between the driving device 20 and the fixed rail 12L can be avoided.

When a relative position of the intermediate gear 33L to the pinion 32L is largely deviated, the sliding device 10L, when activated, produces large operating sound and vibration.

In contrast, in the sliding device 10L according to the first embodiment, the first support body 41L and the second support body 42L are integrally molded (hereinafter, integral configuration).

As a result, as compared to a case in which the first support body 41L and the second support body 42L are assembled together (hereinafter, assembled configuration), a relative positional deviation (hereinafter, variation in dimension) of the intermediate gear 33L to the pinion 32L is reduced. Therefore, improper meshing between the pinion 32L and the intermediate gear 33L is inhibited.

In other words, variation in dimension of the assembled configuration is an accumulated value of a dimensional variation of each of the first support body 41L and the second support body 42L, an assembling variation caused at the time of assembling work, and the like. In contrast, variation in dimension of the integral configuration is only a dimensional variation of one component integrally configured. Accordingly, the integral configuration has smaller variation in dimension than the assembled configuration.

Figure 12:
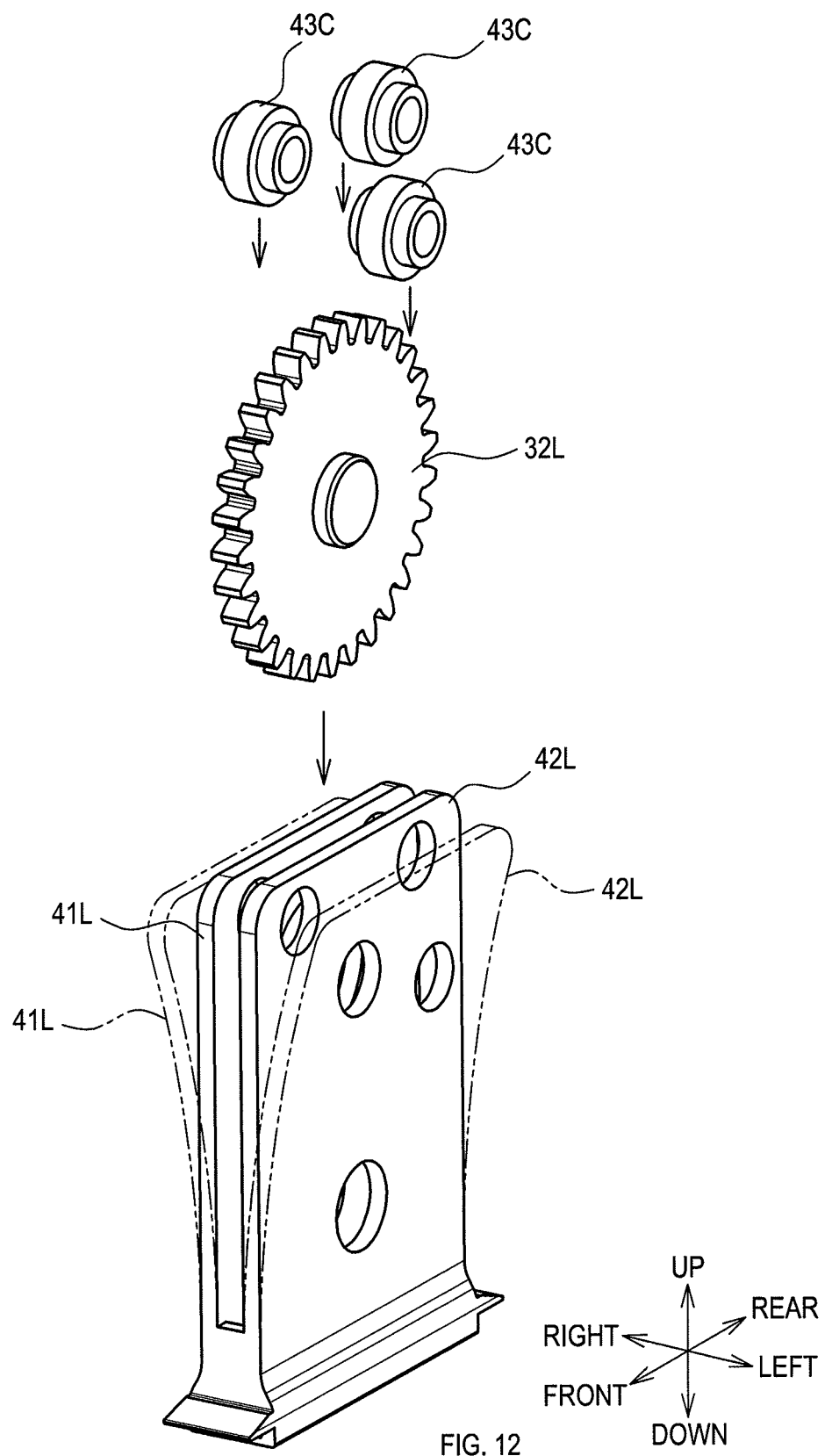
FIG. 12 an explanatory view showing how to assemble the support member, the pinion, and the like according to the first embodiment.

As shown by a two-dot chain line in FIG. 12, a person or an assembling device (hereinafter, operator or the like) that assembles the pinion 32L to the support member 40L elastically deforms the first support body 41L and the second support body 42L so as to separate the upper end 41A of the first support body 41L and the upper end 42A of the second support body 42L from each other, and then assembles the pinion 32L and the three third spacers 43C to the first support body 41L and the second support body 42L.

The operator or the like, after the assembling work is completed, assembles the restricting body 43, that is the first spacers 43A and the second spacers 43B, to the upper end 41A of the first support body 42B and the upper end 42A of the second support body 42L. Thereafter, the bolts B1 are inserted so as to fix the support member 40L and the driving device 20 to the movable rail 13L (see FIG. 10).

As a result, the upper end 41A of the first support body 41L and the upper end 42A of the second support body 42L are restricted from separating from each other. Therefore, separation of the pinion 32L from the first support body 41L and the second support body 42L is inhibited after the assembling work is completed.

The restricting body 43 is configured by the first spacer 43A and the second spacer 43B. As a result, elastic displacement of the upper end 41A of the first support body 41L and the upper end 42A of the second support body 42L is restricted by the movable rail 13L. As a result, as compared to a case of a later-described second embodiment, increase in number of components, assembling steps, etc. of the restricting body 43 can be inhibited.

The bolt B1 for fixing the driving device 20 to the movable rail 13L extends parallel to the center axis, and penetrates the first spacer 43A, the second spacer 43B, the first support body 41L, the second support body 42L, the first wall 13A and the second wall 13B. The first spacer 43A and the second spacer 43B are configured by an elastic member such as rubber.

Therefore, the first spacer 43A and the second spacer 43B, together with the driving device 20, are fixed to the movable rail 13L by the bolt B1. Therefore, fixing structure of the restricting body 43 can be simple. Further, vibration generated when the driving device 20 operates is absorbed by the rubber-made first spacer 43A and second spacer 43B.

The first support body 41L and second support body 42L are integrally molded with resin. As a result, productivity of the support member 40L is improved, and increase in manufacturing cost of the support member 40L is inhibited.

3.2 Restricting Structure of Rack Position

Since the sliding device 10L according to the first embodiment includes the restrictor 50, the rack 31L is restricted from separating from the pinion 32L. Thus, improper meshing between the pinion 32L and the rack 31L is inhibited. Operating sound and vibration produced when the sliding device 10L operates can be reduced.

The restrictor 50 includes the first sliding contact portion 51 that can slidably contact at least a part of the lower surface of the rack 31L. As a result, downward displacement of the rack 31L can be inhibited. Therefore, improper meshing between the pinion 32L the rack 31L can be reliably inhibited.

The first sliding contact portion 51 can slidably contact the rack 31L in the entire width direction. As a result, improper meshing between the pinion 32L and the rack 31L can be reliably inhibited.

The restrictor 50 includes the second sliding contact portion 52 and the third sliding contact portion 53. As a result, since displacement in the width direction of the rack 31L can be inhibited, improper meshing between the pinion 32L and the rack 31L can be reliably inhibited.

The restrictor 50 is provided in the support member 40L. Therefore, as compared to a case in which a member that supports the pinion 32L and the intermediate gear 33L, and the restrictor 50 are provided in different members, a relative positional deviation of the intermediate gear 33L, the pinion 32L, and the rack 31L is reduced. Therefore, improper meshing of the intermediate gear 33L, the pinion 32L, and the rack 31L can be reliably inhibited.

The rack 31L is a strip member, and, as shown in FIG. 7, is fixed to the fixed rail 12L by the fixture 31B at both ends in the longitudinal direction. Therefore, especially in the center of the rack 31L in the longitudinal direction, the rack 31L may be bent and displaced downward in a manner to separate from the pinion 32L.

Thus, in the sliding device 10L including the restrictor 50 as in the first embodiment, improper meshing between the pinion 32L and the rack 31L can be effectively inhibited.

[Second Embodiment]

Figure 13:
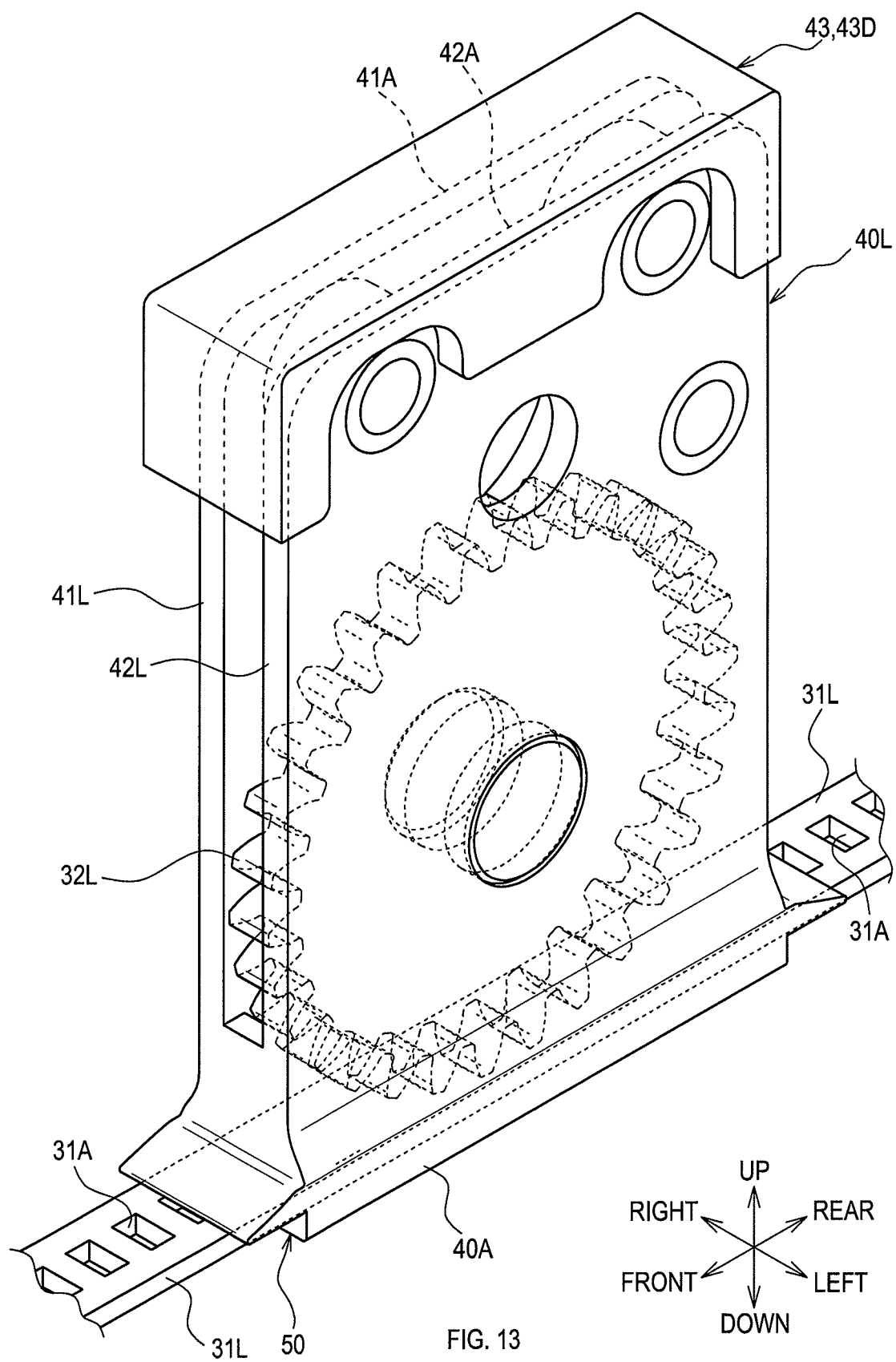
FIG. 13 is a perspective view showing a structure of a support member according to a second embodiment.

The aforementioned restricting body 43 according to the first embodiment is configured by the first spacer 43A and the second spacer 43B. In contrast, the restricting body 43 according to the second embodiment is configured by a cap 43D shown in FIG. 13.

Figure 14:
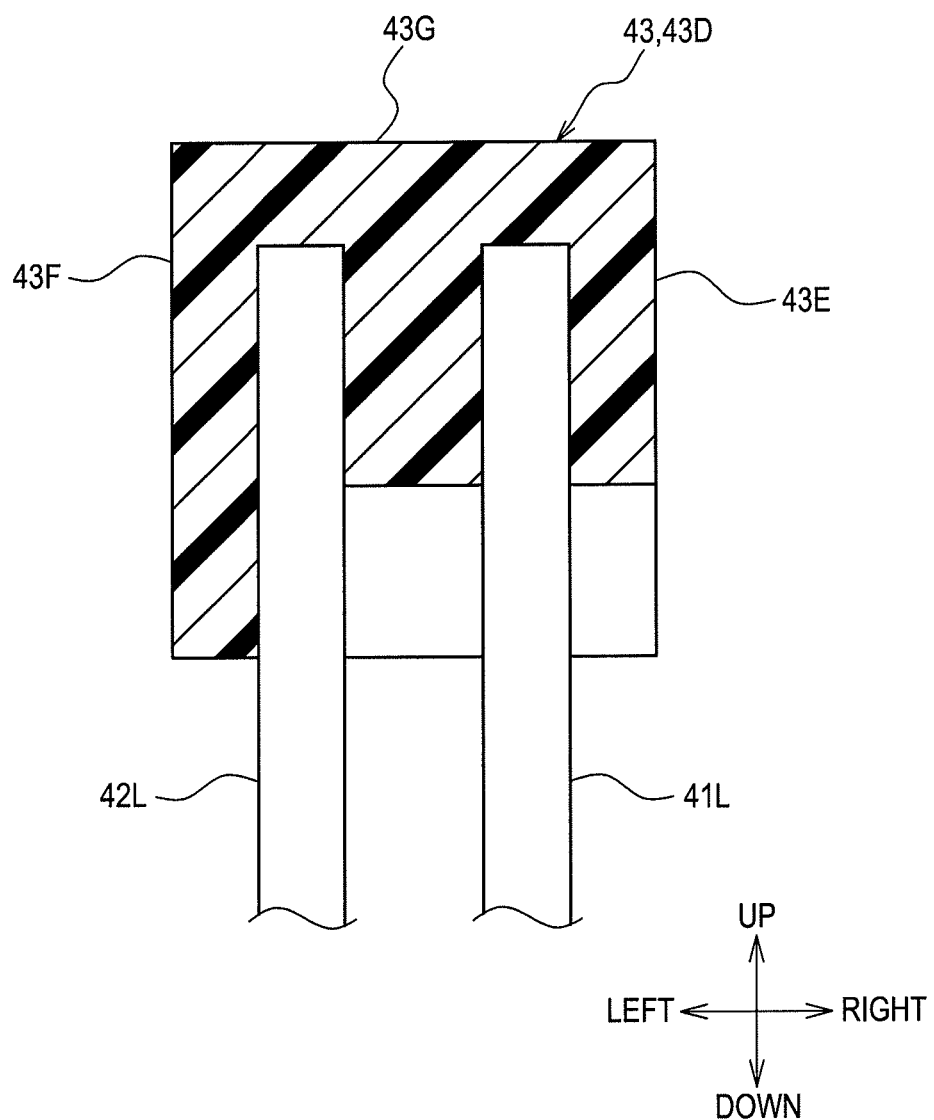
FIG. 14 is a view showing a structure of a cap according to the second embodiment.

The cap 43D covers the upper ends 41A, 42A of the support member 40L so as to hold the upper ends 41A, 42A in a direction parallel to the center axis direction of the pinion 32L. Specifically, as shown in FIG. 14, the cap 43D includes a first wall 43E, a second wall 43F, and the like.

The first wall 43E functions similarly to the first spacer 43A. The second wall 43F functions similarly to the second spacer 43B. The first wall 43E and the second wall 43F are integrated by a top panel 43G.

The cap 43D according to the second embodiment, that is, the first wall 43E, the second wall 43F and the top panel 43G, are integrally molded with resin. This resin is harder than the resin (rubber) which configures the first spacer 43A.

The same reference numbers as in the above-described first embodiment are given to the same components or the like. Thus, the description thereof is not repeated.

[Third Embodiment]

Figure 15:
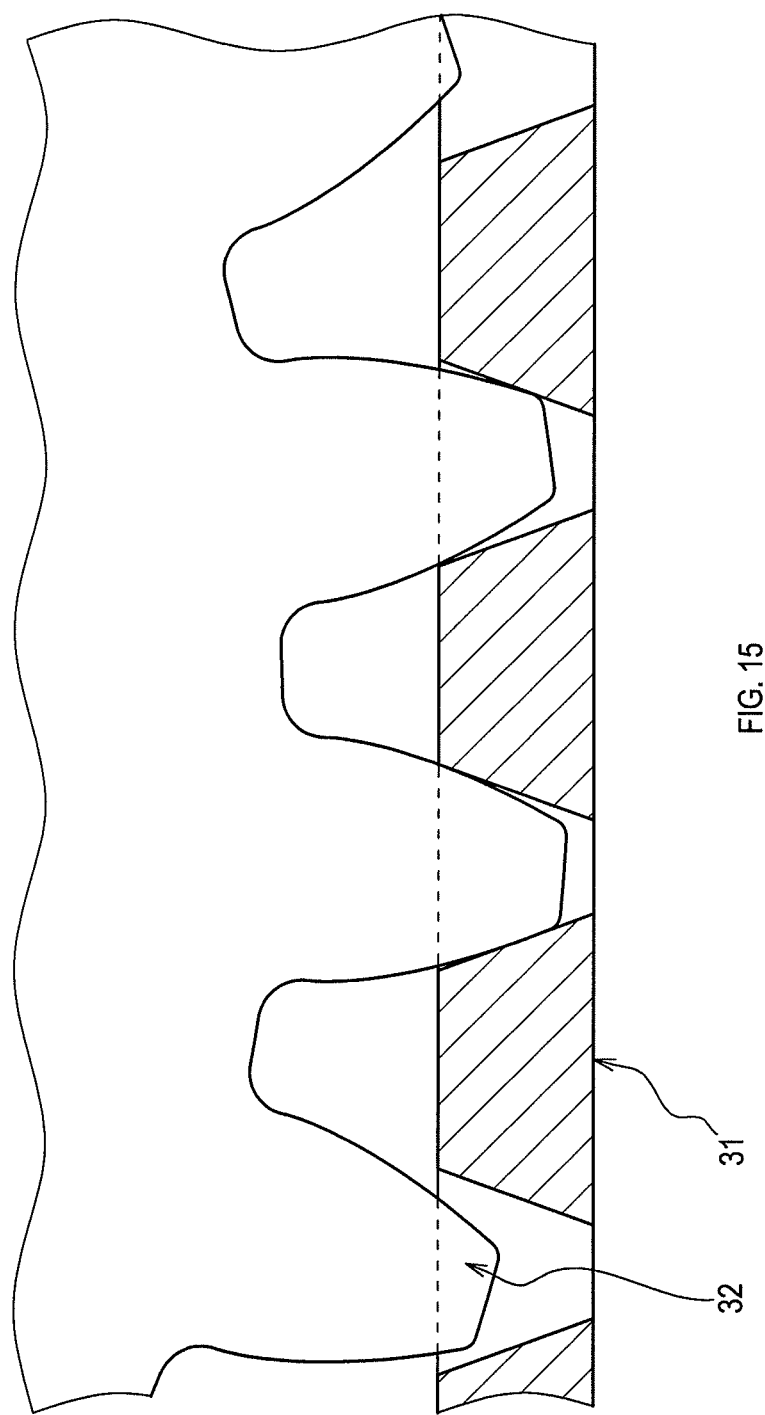
FIG. 15 is a view showing meshing of the pinion and the rack in the sliding device according to a third embodiment.

The rack 31L according to the first embodiment, as shown in FIG. 5, has a rectangular wave tooth profile. In contrast, the rack 31L according to the third embodiment, as shown in FIG. 15, has an involute tooth profile or a trapezoid tooth profile.

The pinion 32L has an involute tooth profile. Therefore, it is desirable that the rack 31L that meshes with the pinion 32L has an involute tooth profile. Generally, when the number of teeth increases in a gear having an involute tooth profile, the tooth profile approaches a trapezoid tooth profile.

Since the rack 31L is a gear having an infinite radius of curvature, even if molded to have an involute tooth profile, the actual tooth profile is substantially equal to a trapezoid tooth profile. Accordingly, the tooth profile of the rack 31L may be a trapezoidal shape configured by the same angle as a pressure angle of the pinion 32L.

As above, in the third embodiment, since the rack 31L and the pinion 32L can smoothly mesh with each other, durability of the rack 31L and the pinion 32L can be improved.

In the third and first embodiments, the teeth of the rack 31L and the pinion 32L may have a helical shape in which a direction of a tooth trace is inclined in the longitudinal direction of the fixed rail 12L. The same reference numbers as in the above-described first embodiment are given to the same components or the like. Thus, the description thereof is not repeated in the third embodiment.

[Other Embodiments]

In the sliding device 10L of the above-described embodiments, the driving force of the driving device 20 is transmitted to the pinion 32L via the intermediate gear 33L. The present disclosure is not limited to this.

In the above-described embodiments, the first support body 41L and the second support body 42L for supporting the pinion 32L and the intermediate gear 33L are integrally molded with resin. The present disclosure is not limited to this.

That is, the present disclosure may be configured such that, for example, (a) the first support body 41L and the second support body 42L are integrally molded with metal (die-cast product), or (b) the first support body 41L and the second support body 42L are integrally assembled via fasteners such as screws.

In the above-described embodiments, the restricting body 43 restricts the upper end 41A of the first support body 41L and the upper end 42A of the second support body 42L from separating from each other. The present disclosure is not limited to this.

That is, the present disclosure may be configured such that, for example, the restricting body 43 is eliminated. In the configuration as such, the first wall 13A and second wall 13B may be in contact with the support member 40L so as to restrict the upper end 41A of the first support body 41L and the upper end 42A of the second support body 42L from separating from each other.

The restricting body 43 in the above-described embodiments is configured by the first spacer 43A and the second spacer 43B, using the grommet G. The present disclosure is not limited to this.

That is, in the present disclosure, for example, the restricting body 43 may be configured with metal or harder resin than the grommet G. The restricting body 43 may be configured to be fixed to the movable rail 13L and the support member 40L with a fixed-only bolt different from the above bolt B1.

In the above-described embodiments, the restrictor 50 is provided in the support member 40L. The present disclosure is not limited to this. The present disclosure may be configured such that, for example, (a) the restrictor 50 is eliminated, (b) the restrictor 50 is provided in other than the support member 40L (for example, in the fixed rail 12L), or the like The restrictor 50 in the above-described embodiments includes the first sliding contact portion 51 to the third sliding contact portion 53. The present disclosure is not limited to this. The present disclosure may be configured such that, for example, at least one of the first sliding contact portion 51 to the third sliding contact portion 53 is eliminated.

The first sliding contact portion 51 in the above-described embodiments can slidably contact the rack 31L in the entire width direction. The present disclosure is not limited to this. That is, the first sliding contact portion 51 according to the present disclosure, for example, may be configured to be able to slidably contact the rack 31L at a portion excluding the center in the width direction.

The rack 31L in the above-described embodiments is a strip-like member, and the both ends in the longitudinal direction are fixed to the fixed rail 12L. The present disclosure is not limited to this. That is, the rack 31L according to the present disclosure, for example, may be configured to have a toothed portion that meshes with the toothed portion 32A of the pinion 32L.

In the above-described embodiments, the vehicle seat according to the present disclosure is applied to a passenger car. The present disclosure is not limited to this, and can be also applied to a seat for use in a vehicle such as railway vehicles, ships and boats, and aircrafts, as well as to a stationary type seat for use such as in theatres and at home.

Furthermore, the present disclosure is not limited to the above-described embodiments as long as the present disclosure meets the gist of the technical idea described in the above-described embodiments. Thus, at least two embodiments among the plurality of embodiments described above may be combined, or any of the components described in the above-described embodiments may be eliminated.

What is claimed is:

1. A sliding device that slidably supports a seat for vehicle, the sliding device comprising:
    a fixed rail fixed to the vehicle;
    a movable rail to which the seat for vehicle is fixed, the movable rail being slidable with respect to the fixed rail;
    a rack fixed inside the fixed rail and extending parallel to a longitudinal direction of the fixed rail;

a pinion arranged above the rack and configured to mesh with the rack, wherein the pinion has a first end in a center axis direction of the pinion and has a second end in the center axis direction of the pinion;

an intermediate gear configured to mesh with the pinion, and receive a driving force to rotate so as to transmit the driving force to the pinion;

a driving device configured to supply the driving force to the intermediate gear; and a support member configured to support the pinion and the intermediate gear, the support member being fixed to the movable rail, the support member including:
- an elastically deformable first support body configured to at least support the first end of the pinion, a lower end of the first support body being located below the pinion; and
- an elastically deformable second support body configured to support the second end of the pinion and the intermediate gear, a lower end of the second support body being located below the pinion,
- the first support body and the second support body being coupled below the pinion and integrally molded, the sliding device further comprising a restricting body configured to restrict elastic displacement such that an end of the first support body above the pinion and an end of the second support body above the pinion are restricted from separating from each other.

2. The sliding device according to claim 1, wherein the movable rail includes
- a first wall separated from the first support body on an opposite side of the second support body with the first support body interposed therebetween; and
- a second wall separated from the second support body on an opposite side of the first support body with the second support body interposed therebetween,
- the restricting body includes a first spacer arranged between the first wall and the first support body, and a second spacer arranged between the second wall and the second support body.

3. The sliding device according to claim 1, further comprising
a bolt for fixing the driving device to the movable rail, the bolt extending in parallel to the center axis direction and penetrating a first spacer, a second spacer, the first support body, the second support body, a first wall, and a second wall, wherein
the first spacer and the second spacer are made of rubber.

4. The sliding device according to claim 1, wherein the first support body and the second support body are integrally molded with resin.

5. The sliding device according to claim 1, wherein the rack has an involute tooth profile or a trapezoid tooth profile.

* * * * *